(12) United States Patent  
Hoso et al.

(10) Patent No.: US 12,529,211 B2  
(45) Date of Patent: Jan. 20, 2026

(54) MEASURING DEVICE, AND CONSTRUCTION MACHINE

(71) Applicants: KOBELCO CONSTRUCTION MACHINERY CO., LTD., Hiroshima (JP); HIROSHIMA UNIVERSITY, Higashi-Hiroshima (JP)

(72) Inventors: Yukihiro Hoso, Hiroshima (JP); Sho Fujiwara, Hiroshima (JP); Yusuke Funahara, Hiroshima (JP); Toru Tamaki, Hiroshima (JP)

(73) Assignees: KOBELCO CONSTRUCTION MACHINERY CO., LTD., Hiroshima (JP); HIROSHIMA UNIVERSITY, Higashi-Hiroshima (JP)

( * ) Notice: Subject to any disclaimer, the term of this patent is extended or adjusted under 35 U.S.C. 154(b) by 913 days.

(21) Appl. No.: 17/778,942

(22) PCT Filed: Oct. 14, 2020

(86) PCT No.: PCT/JP2020/038819  
§ 371 (c)(1),  
(2) Date: May 23, 2022

(87) PCT Pub. No.: WO2021/106410  
PCT Pub. Date: Jun. 3, 2021

(65) Prior Publication Data  
US 2022/0412056 A1    Dec. 29, 2022

(30) Foreign Application Priority Data  
Nov. 26, 2019   (JP) .................................. 2019-213340

(51) Int. Cl.  
*E02F 9/26*        (2006.01)

(52) U.S. Cl.  
CPC .............. *E02F 9/264* (2013.01); *E02F 9/261* (2013.01)

(58) Field of Classification Search  
CPC .................................. E02F 9/264; E02F 9/261  
(Continued)

(56) References Cited

U.S. PATENT DOCUMENTS

| | | | |
|---|---|---|---|
| 6,085,583 A | 7/2000 | Cannon et al. | |
| 2008/0005938 A1* | 1/2008 | Aebischer ............... | E02F 9/264 73/32 R |

(Continued)

FOREIGN PATENT DOCUMENTS

| | | |
|---|---|---|
| JP | 2008-241300 A | 10/2008 |
| JP | 2017-172316 A | 9/2017 |

(Continued)

OTHER PUBLICATIONS

Extended European Search Report issued Dec. 9, 2022 in European Patent Application No. 20893901.7, 9 pages.

(Continued)

*Primary Examiner* — Aditya S Bhat  
(74) *Attorney, Agent, or Firm* — Oblon, McClelland, Maier & Neustadt, L.L.P.

(57) ABSTRACT

A measurement device is configured to calculate, based on second measurement data provided by a distance detector, second contour data indicating a surface contour of an object contained in the container at a second time after a first time; calculate differential information indicating a difference between first posture data and second posture data which is posture data provided by a posture detector at the second time; rotate, based on the differential information, the second contour data in a three-dimensional coordinate space of the distance detector; and specify a region defined by the rotated second contour data and the first contour data, and (Continued)

calculate, based on the specified region, a volume of the object contained in the container at the second time.

7 Claims, 11 Drawing Sheets

(58) Field of Classification Search
USPC .......................................................... 702/156
See application file for complete search history.

(56) References Cited

U.S. PATENT DOCUMENTS

| | | |
|---|---|---|
| 2017/0328032 A1 | 11/2017 | Matsuo et al. |
| 2019/0026914 A1* | 1/2019 | Hageman ............... G01B 11/26 |
| 2021/0017738 A1 | 1/2021 | Sano |
| 2022/0412056 A1* | 12/2022 | Hoso .................... G01G 19/086 |

FOREIGN PATENT DOCUMENTS

| | | |
|---|---|---|
| WO | WO 2016/092684 A1 | 6/2016 |
| WO | WO 2019/082397 A1 | 5/2019 |
| WO | WO 2019/189260 A1 | 10/2019 |

OTHER PUBLICATIONS

International Search Report issued Dec. 22, 2020 in PCT/JP2020/038819, filed on Oct. 14, 2020, 2 pages.

* cited by examiner

MEASURING DEVICE, AND CONSTRUCTION MACHINE

CROSS-REFERENCE TO RELATED APPLICATIONS

This application is a 371 of International Application No. PCT/JP2020/038819 filed Oct. 14, 2020, and claims the benefit of priority from prior Japanese Application No. 2019-213340 filed Nov. 26, 2019.

TECHNICAL FIELD

The present invention relates to a technology of measuring a volume of an object contained in a container rotatably attached to an arm member.

BACKGROUND ART

A hydraulic excavator is configured to calculate a volume of an object excavated by a bucket to grasp a work quantity on a work day. When the hydraulic excavator performs a work of loading the excavated object to a dump truck, a volume of the excavated object is calculated so as not to exceed a maximum loading capacity of the dump truck. Therefore, the volume of the excavated object is preferably calculated with high accuracy suitably for various aims. The following Patent Literatures 1 and 2 have been known as technologies of each calculating a volume of an excavated object.

Patent Literature 1 discloses a technology of calculating a work quantity of a bucket by calculating a difference between a surface contour of the bucket calculated from an image of a state of the bucket as captured after excavation and an inner part contour of the bucket calculated from an image of a state of the inner part of the bucket as captured after soil discharge.

Patent Literature 2 discloses a technology of obtaining a length from a bottom of a bucket to a surface of an excavated object by adding a length from an opening plane of the bucket in a state of containing the excavated object to the surface of the excavated object and a length from the bottom of the bucket to the opening plane of the bucket in an empty state, and calculating, based on the obtained length, a volume of the excavated object.

However, the technology of Patent Literature 1 requires the bucket to move to a predetermined position per soil discharge, and thus a work efficiency decreases.

Patent Literature 2 discloses a technology of capturing an image of the bucket in the empty state by a stereo camera, and preliminarily learning a shape of the bucket from the captured image based on the length from the bottom of the bucket to the opening plane of the bucket.

However, the technology of Patent Literature 2 includes merely calculating the length from the bottom to the opening plane of the bucket in the learning, and fails to provide posture data of the bucket. Therefore, the technology of Patent Literature 2 has a problem of a failure in accurately calculating a volume of the excavated object when the posture of the bucket in the learning and the posture of the bucket in working differ from each other.

CITATION LIST

Patent Literature

Patent Literature 1: Japanese Unexamined Patent Publication No. 2008-241300

Patent Literature 2: International Unexamined Patent Publication No. 2016/092684

SUMMARY OF INVENTION

An object of the present invention is to provide a technology of accurately calculating a volume of an object contained in a bucket while preventing a decrease in a work efficiency.

A measurement device according to one aspect of the present invention is a measurement device for a working gear including: an arm member tiltably attached to a main body and having one or more joints for allowing a posture of the arm member to be changed; and a container rotatably attached to the arm member and having an opening for permitting an object to enter and leave the container, the measurement device being configured to measure a volume of the object contained in the container. The measurement device includes: a distance detector which is attached to the aim member and provides measurement data indicating a distance to a subject; a posture detector which provides posture data indicating a posture of the working gear; a first contour calculation part which calculates, based on first measurement data which is the measurement data of the container in an empty state provided by the distance detector, first contour data indicating a contour of the container; a memory which stores first posture data which is the posture data at a first time when the first measurement data is provided and the first contour data in association with each other; a second contour calculation part which calculates, based on second measurement data which is the measurement data of the object contained in the container as provided by the distance detector, second contour data indicating a surface contour of the object at a second time after the first time; a differential information calculation part which calculates differential information indicating a difference between the first posture data and the second posture data which is the posture data provided by the posture detector at the second time; a rotation processing part which rotates, based on the differential information, the second contour data in a three-dimensional coordinate space of the distance detector so that the posture of the working gear from the distance detector to the container at the second time agrees with the posture of the working gear from the distance detector to the container at the first time; and a volume calculation part which specifies a region defined by the rotated second contour data and the first contour data, and calculates, based on the specified region, a volume of the object contained in the container at the second time.

DESCRIPTION OF EMBODIMENTS

Hereinafter, an embodiment of the present invention will be described with reference to the accompanying drawings. It should be noted that the following embodiment illustrates one specific example of the present invention, and does not delimit the protection scope of the present invention.

Hereinafter, a measurement device according to the embodiment will be described. A case where the measurement device is mounted on a hydraulic excavator will be described below as an example. A part of structural elements of the measurement device may be mounted on the hydraulic excavator, and the remaining structural elements may be mounted on an external device. Examples of the external device include a cloud server. The measurement device may be mounted on a construction machine other than a hydraulic excavator 1. Alternatively, the measurement device may be mounted on a working machine other than the construction machine. The working machine may include any machine as long as the machine causes a container to contain an object. For instance, the working machine includes an arm member having one or more joints for allowing a posture of the aim member to be changed, and a container rotatably attached to a distal end of the arm member. The container has an opening and is used to contain an object, such as soil and sand, and particles.

Figure 1:
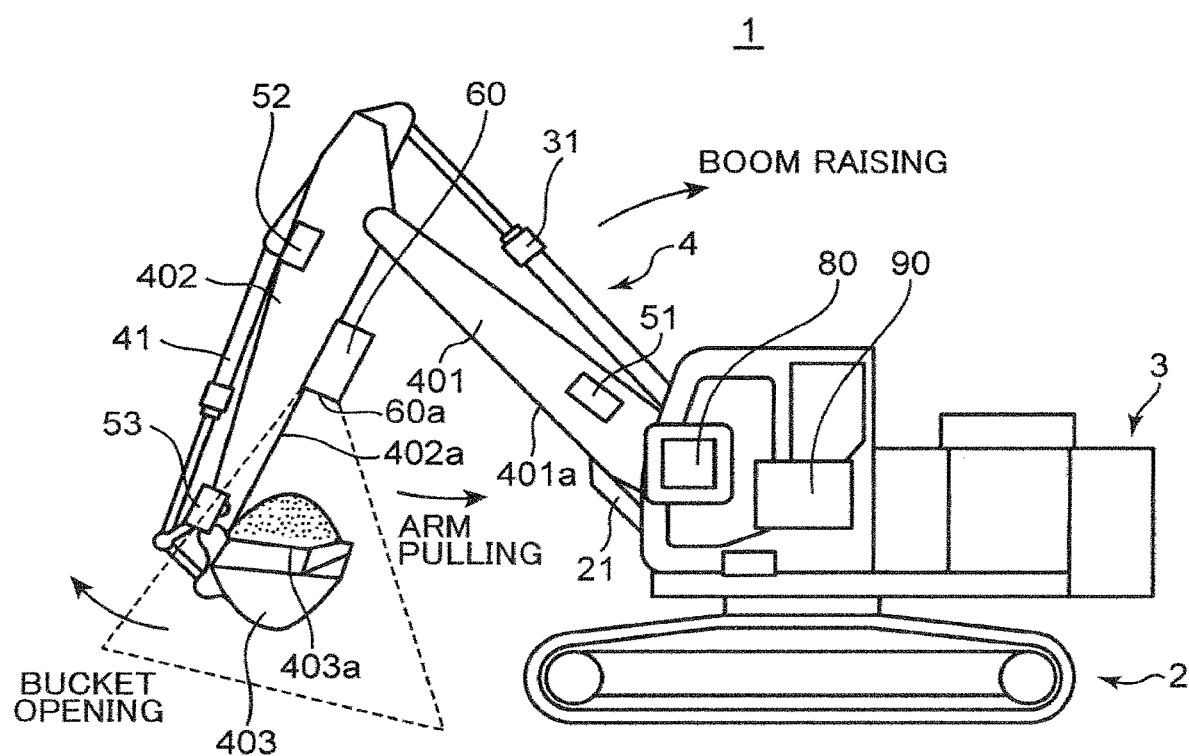
FIG. 1 shows an example of an exterior appearance-based configuration of a hydraulic excavator.

FIG. 1 shows an example of an exterior appearance-based configuration of the hydraulic excavator 1. The hydraulic excavator 1 includes a lower traveling body 2, an upper slewing body 3, and a working gear 4. The lower traveling body 2 includes, for example, a crawler configured to travel on the ground. The upper slewing body 3 is mounted on an upper portion of the lower traveling body 2 slewably about a vertical axis with respect to the lower traveling body 2. The upper stewing body 3 is mounted with a display part 80 and a controller 90. The upper slewing body 3 is an example of the main body. The display part 80 is provided to an operator seat, and displays various information to the operator. The controller 90 controls the entirety of the hydraulic excavator 1.

The working gear 4 is used to perform a work or task, e.g., an excavation task. The working gear 4 includes a boom 401, an arm 402, and a bucket 403. The boom 401 is tiltably attached to a front end of the upper slewing body 3. The arm 402 is attached to a distal end of the boom 401 rotatably about a horizontal axis. The bucket 403 is rotatably attached to a distal end of the arm 402. The bucket 403 is an exemplary container for containing an object. The boom 401 and the arm 402 exemplify an arm member. The bucket 403 has an opening 403*a*. The bucket 403 is configured to contain soil and sand which enters through the opening 403*a* in the excavation task. The object is exemplified by the soil and sand.

The hydraulic excavator 1 further includes a boom cylinder 21, an arm cylinder 31, and a bucket cylinder 41.

The boom cylinder 21 is located between the upper slewing body 3 and the boom 401. The boom cylinder 21 extends and contracts to raise and lower the boom 401.

The arm cylinder 31 is located between the boom 401 and the arm 402. The arm cylinder 31 extends and contracts to rotate the arm 402.

The bucket cylinder 41 is located between the arm 402 and the bucket 403. The bucket cylinder 41 extends and contracts to rotate the bucket 403.

The hydraulic excavator 1 further includes a boom angle sensor 51, an arm angle sensor 52, and a bucket angle sensor 53.

The boom angle sensor 51 detects a boom angle representing a tilt angle of the boom 401 with respect to the upper slewing body 3. The boom angle sensor 51 is provided, for example, at a proximal end of the boom 401.

The arm angle sensor 52 detects an arm angle representing a rotation angle of the arm 402 with respect to the boom 401. The arm angle sensor 52 is provided, for example, at a proximal end of the arm 402. The bucket angle sensor 53 detects a bucket angle representing a rotation angle of the bucket 403 with respect to the arm 402. The bucket angle sensor 53 is provided, for example, at the distal end of the arm 402.

A distance measurement sensor 60 (which is an example of the distance detector) is arranged at the working gear 4, and provides measurement data indicating a distance to a subject. Examples of the distance measurement sensor 60 include a sensor, such as a TOF (Time of Flight) sensor or a stereo camera, which can measure a depth degree for each of pixels. The distance measurement sensor 60 may be a LIDAR.

The distance measurement sensor 60 is arranged on a rear surface 402*a* of the arm 402. The distance measurement sensor 60 has a sensor surface 60*a* oriented toward the bucket 403. The distance measurement sensor 60 having this configuration can measure contour data of an inner surface of the bucket 403 and the soil and sand contained in the bucket 403. The rear surface 402*a* is an example of the surface facing the opening 403*a* of the bucket 403.

The distance measurement sensor 60 may be configured to be attachable to and detachable from the rear surface 402*a*. With this configuration, the working gear 4 in the embodiment is mountable onto another already-existing hydraulic excavator 1. In this case, a measurement mode to be described later is executed and first contour data and posture data to be described later is stored in a memory every time the distance measurement sensor 60 is attached. Besides, the measurement mode may be executed in replacement of the bucket 403 after the distance measurement sensor 60 is attached. The distance measurement sensor 60 may be included as a default for the hydraulic excavator 1. In this case, the measurement mode is executed, for example, every time the bucket 403 is replaced with another one.

In the embodiment, the hydraulic excavator 1 includes a semi-automatic operation mode for semi-automatically performing an excavation operation and a raising operation in response to a manipulation by the operator to the arm 402. In the semi-automatic operation mode, the operator has only to manipulate an arm manipulating device. The controller 90 causes the working gear 4 to start the excavation operation in response to a start of the manipulation of the arm manipulating device. The excavation operation causes a distal end of the bucket 403 to automatically move in parallel to the ground in a state where the bucket 403 advances under the ground. When the bucket 403 contains the soil and sand through the excavation operation, the raising operation is started. The raising operation includes a series of automatic actions of raising the bucket 403 containing the soil and sand, slewing the upper slewing body 3, and discharging the soil and sand by opening the bucket 403 at a predetermined position.

When the arm manipulating device is returned to a neutral position in response to a manipulation by the operator in the excavation operation, the controller 90 suspends the excavation operation. The suspension is performed in the raising operation in the same manner. A moving speed of the bucket 403 in each of the excavation operation and the raising operation is set to a value corresponding to a manipulation amount input to the arm manipulating device.

As described above, the operator has only to manipulate the arm 402, and thereafter the controller 90 automatically executes the excavation operation and the raising operation in the semi-automatic operation mode. Therefore, even an inexperienced operator for maneuvering the hydraulic excavator 1 can smoothly proceed with the excavation operation and the raising operation.

Figure 2:
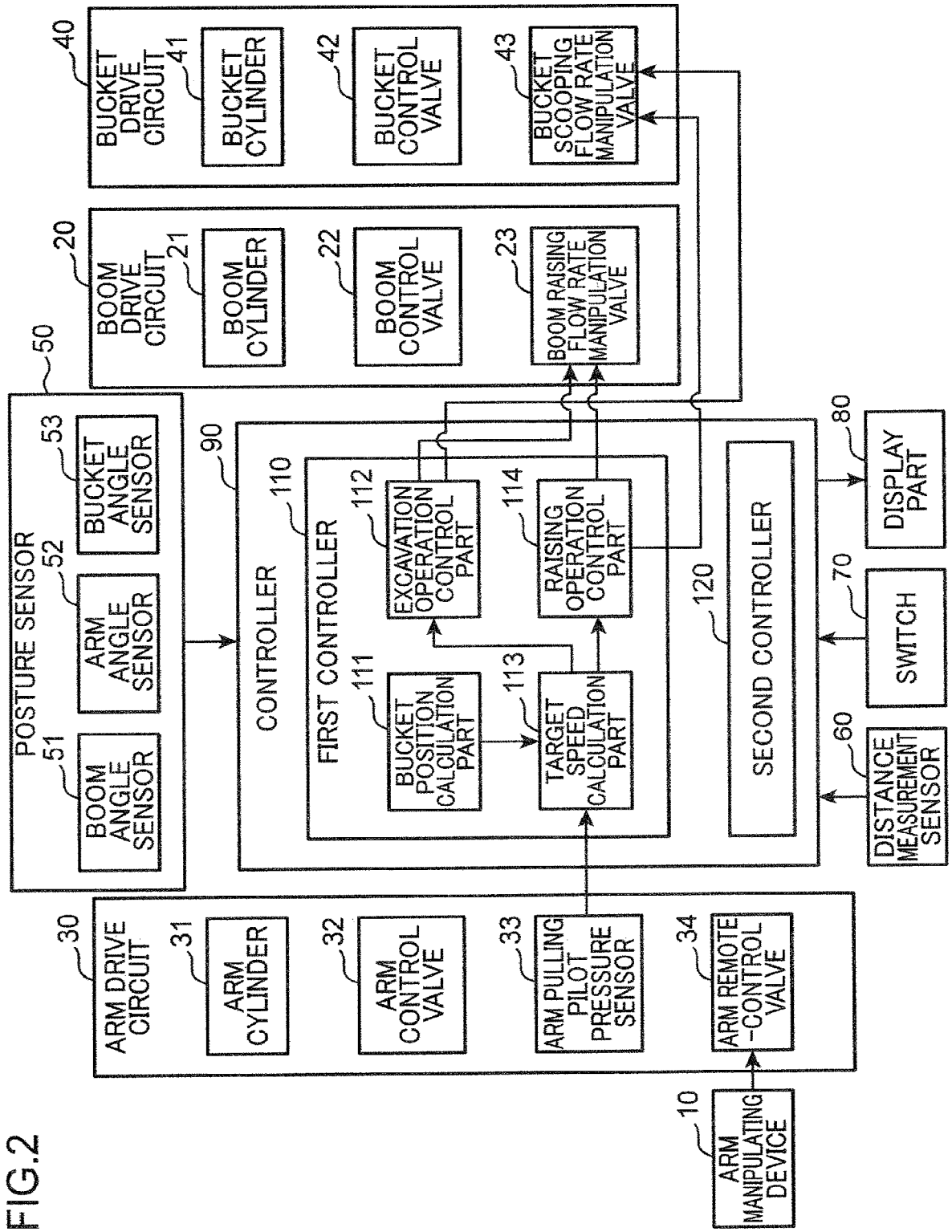
FIG. 2 is a block diagram showing an example of a configuration of the hydraulic excavator.

FIG. 2 is a block diagram showing an example of a configuration of the hydraulic excavator 1. The hydraulic excavator 1 includes an arm manipulating device 10, a boom drive circuit 20, an arm drive circuit 30, a bucket drive circuit 40, a posture sensor 50 (which is an example of the posture detector), and a switch 70 in addition to the controller 90, the distance measurement sensor 60, and the display part 80 each shown in FIG. 1. The block diagram in FIG. 2 shows only blocks required to execute the semi-automatic operation mode without illustration of blocks required to execute a manual mode.

The manual mode causes the hydraulic excavator 1 to perform an operation, such as the excavation operation and the raising operation, only in response to the manipulation by the operator without any assistance of the controller 90. In the present invention, each of the excavation operation and the raising operation is not limited to execution in the semi-automatic operation mode, and may be executed in the manual mode or a fully-automatic operation mode. The fully-automatic mode enables automatic execution of each of the excavation operation and the raising operation without relying on a manipulation by the operator to the arm 402. In the fully-automatic mode, the operator has only to execute an input through, for example, an excavation start button. Then, the controller 90 sets the moving speed of the bucket 403 to a predetermined speed to thereby automatically execute the excavation operation and the raising operation.

The arm manipulating device 10 receives an input of an arm manipulation by the operator for moving the arm 402. The arm manipulation includes an arm pulling manipulation of moving the distal end of the arm 402 toward the upper slewing body 3 and an arm pushing manipulation of moving the distal end of the aim 402 away from the upper slewing body 3.

The aim drive circuit 30 is a hydraulic circuit for driving the arm 402. The arm drive circuit 30 includes an arm control valve 32, an arm pulling pilot pressure sensor 33, and an arm remote-control valve 34 in addition to the arm cylinder 31 shown in FIG. 1.

The arm cylinder 31 extends and contracts in response to a supply of a hydraulic fluid from a hydraulic pump, thereby causing the arm 402 to perform an arm pulling operation and an arm pushing operation.

The arm control valve 32 is formed of a pilot-operative three-way switch valve having an arm pulling pilot port and an arm pushing pilot port. The arm control valve 32 opens at a stroke corresponding to an arm pulling pilot pressure input to the arm pulling pilot port. Owing to the opening of the valve, the flow rate and the flow direction of the hydraulic fluid supplied to the arm cylinder 31 are regulated, and the speed and the direction of the arm 402 are controlled, so that the arm 402 performs the arm pulling operation. The arm control valve 32 opens at a stroke corresponding to an arm pushing pilot pressure input to the arm pushing pilot port. Owing to the opening of the valve, the flow rate and the flow direction of the hydraulic fluid supplied to the arm cylinder 31 are regulated, and the speed and the direction of the arm 402 are controlled, so that the arm 402 performs the arm pushing operation.

The arm pulling pilot pressure sensor 33 detects the arm pulling pilot pressure input to the arm pulling pilot port of the arm control valve 32, and inputs the detected arm pulling pilot pressure to the controller 90.

The arm remote-control valve 34 inputs, to the arm pulling pilot port of the arm control valve 32, the arm pulling pilot pressure corresponding to a manipulation amount of the arm pulling manipulation input to the arm manipulating device 10. The arm remote-control valve 34 inputs, to the arm pushing pilot port of the arm control valve 32, the arm pushing pilot pressure corresponding to a manipulation amount of the arm pushing manipulation input to the arm manipulating device 10.

The boom drive circuit 20 is a hydraulic circuit for driving the boom 401. The boom drive circuit 20 includes a boom control valve 22 and a boom raising flow rate manipulation valve 23 in addition to the boom cylinder 21 shown in FIG. 1.

The boom cylinder 21 extends and contracts in response to the supply of the hydraulic fluid from the hydraulic pump, thereby causing the boom 401 to perform a boom raising operation and a boom lowering operation.

The boom control valve 22 is formed of a pilot-operative three-way switch valve having a boom raising pilot port and a boom lowering pilot port. The boom control valve 22 opens at a stroke corresponding to a boom raising pilot pressure input to the boom raising pilot port. Owing to the opening of the valve, the flow rate and the flow direction of the hydraulic fluid supplied to the boom cylinder 21 are regulated, and the speed and the direction of the boom 401 are controlled, so that the boom 401 performs the boom raising operation. The boom control valve 22 opens at a stroke corresponding to a boom lowering pilot pressure input to the boom lowering pilot port. Owing to the opening of the valve, the flow rate and the flow direction of the hydraulic fluid supplied to the boom cylinder 21 are regulated, and the speed and the direction of the boom 401 are controlled, so that the boom 401 performs the boom lowering operation.

The boom raising flow rate manipulation valve 23 reduces the pilot pressure input from an unillustrated pilot hydraulic pressure source to the pilot port in response to a boom flow rate instruction signal input from the controller 90. In this manner, the controller 90 automatically regulates the pilot pressure input to the boom raising pilot port through the boom raising flow rate manipulation valve 23.

The bucket drive circuit 40 is a hydraulic circuit for driving the bucket 403. The bucket drive circuit 40 includes a bucket control valve 42 and a bucket scooping flow rate manipulation valve 43 in addition to the bucket cylinder 41 shown in FIG. 1.

The bucket cylinder 41 extends and contracts in response to the supply of the hydraulic fluid from the hydraulic pump, thereby causing the bucket 403 to perform a bucket scooping operation and a bucket opening operation.

The bucket control valve 42 is formed of a pilot-operative three-way switch valve having a bucket scooping pilot port and a bucket opening pilot port. The bucket control valve 42 opens at a stroke corresponding to a bucket scooping pilot pressure input to the bucket scooping pilot port. Owing to the opening of the valve, the flow rate and the flow direction of the hydraulic fluid supplied to the bucket cylinder 41 are regulated, and the speed and the direction of the bucket 403 are controlled, so that the bucket 403 performs the bucket scooping operation. The bucket control valve 42 opens at a stroke corresponding to a bucket opening pilot pressure input to the bucket opening pilot port. Owing to the opening of the valve, the flow rate and the flow direction of the hydraulic fluid supplied to the bucket cylinder 41 are regulated, and the speed and the direction of the bucket 403 are controlled, so that the bucket 403 performs the bucket opening operation.

The bucket scooping flow rate manipulation valve 43 reduces the pilot pressure input from the unillustrated pilot hydraulic pressure source to the bucket scooping pilot port in response to a bucket flow rate instruction signal input from the controller 90. In this manner, the controller 90 automatically regulates the pilot pressure input to the bucket scooping pilot port through the bucket scooping flow rate manipulation valve 43.

The posture sensor 50 includes the boom angle sensor 51, the arm angle sensor 52, and the bucket angle sensor 53 each shown in FIG. 1.

The boom angle sensor 51, the arm angle sensor 52, and the bucket angle sensor 53 respectively input a boom angle, an arm angle, and a bucket angle to the controller 90 in, for example, a predetermined calculation period.

The distance measurement sensor 60 inputs the measurement data provided in the predetermined calculation period to the controller 90. The measurement data includes distance image data indicating a depth degree of a certain subject in a view filed of the distance measurement sensor 60 for each of pixels.

The switch 70 receives an input of a manipulation by the operator for changing the mode of the hydraulic excavator 1. The switch 70 may be a physical switch provided to the operator seat, or may be a graphical user interface displayed on the display part 80.

The controller 90 includes, for example, a computer including a CPU and a memory, or a dedicated electric circuit. The controller 90 includes a first controller 110 and a second controller 120.

The first controller 110 controls the hydraulic excavator 1 in the semi-automatic operation mode. The first controller 110 includes a bucket position calculation part 111, an excavation operation control part 112, a target speed calculation part 113, and a raising operation control part 114.

The bucket position calculation part 111 calculates a position of a specific portion of the bucket 403, based on the boom angle, the arm angle, and the bucket angle respectively measured by the boom angle sensor 51, the arm angle sensor 52, and the bucket angle sensor 53. An example of the specific portion is a distal end position of the bucket 403. The position of the specific portion is calculated by, for example, using a geometric calculation based on a boom length, an arm length, and a bucket length each having been known, and based on the measured boom angle, arm angle, and bucket angle. The distal end position is calculated by, for example, in a predetermined calculation period.

The target speed calculation part 113 calculates a target speed of each of the boom 401 and the bucket 403, based on the arm pulling pilot pressure measured by the arm pulling pilot pressure sensor 33 and the position of the specific portion of the bucket 403 calculated by the bucket position calculation part 111.

The target speed of the boom 401 in the excavation operation represents, for example, a target speed in a raising direction of the boom 401 for bringing a formation surface closer to a predetermined target formation surface. The target speed of the bucket 403 in the excavation operation represents a target speed of the bucket 403 for automatically moving the specific portion of the bucket 403 along the target formation surface in parallel thereto in accordance with the arm pulling operation.

The target speed of the boom 401 in the raising operation represents, for example, a target speed in the raising direction of the boom 401 for moving the bucket 403 to a predetermined discharge position after a finish of the excavation operation. The target speed of the bucket 403 in the raising operation represents, for example, a target speed in a scooping direction of the bucket 403 for moving the bucket 403 to the predetermined discharge position after the finish of the excavation operation.

The excavation operation control part 112 controls the boom raising flow rate manipulation valve 23 and the bucket scooping flow rate manipulation valve 43 so that each of the boom 401 and the bucket 403 operates at the corresponding target speed of each of the boom 401 and the bucket 403 in the excavation operation as calculated by the target speed calculation part 113. This control attains semi-automatic execution of the excavation operation.

The raising operation control part 114 controls the boom raising flow rate manipulation valve 23 and the bucket scooping flow rate manipulation valve 43 so that each of the boom 401 and the bucket 403 operates at the corresponding target speed of each of the boom 401 and the bucket 403 in the raising operation as calculated by the target speed calculation part 113. This control attains semi-automatic execution of the raising operation.

The target speed calculation part 113 performs shifting between the excavation operation and the raising operation. For instance, the target speed calculation part 113 causes the excavation operation control part 112 to finish the excavation operation in finishing the excavation operation, and causes the raising operation control part 114 to start the raising operation. In contrast, the target speed calculation part 113 may cause the raising operation control part 114 to finish the raising operation at a finish of discharging in the raising operation, and cause the excavation operation control part 112 to start the excavation operation.

Figure 3:
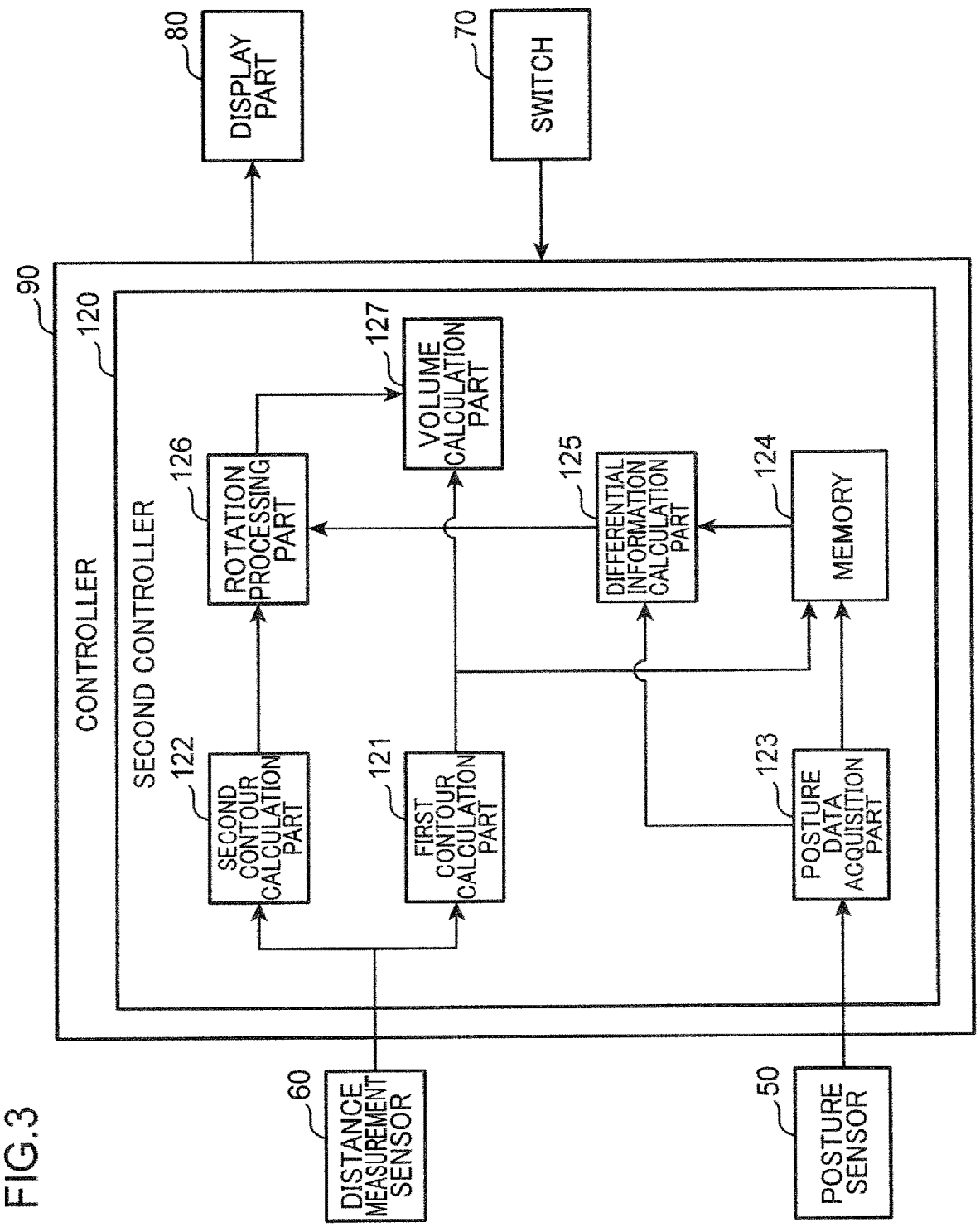
FIG. 3 is a block diagram showing an example of the configuration of the hydraulic excavator with a focus on a second controller.

The second controller 120 controls a process of calculating a volume of the soil and sand contained in the bucket 403. FIG. 3 is a block diagram showing an example of the configuration of the hydraulic excavator 1 with a focus on the second controller 120.

The second controller 120 includes a first contour calculation part 121, a second contour calculation part 122, a posture data acquisition part 123, a memory 124, a differential information calculation part 125, a rotation processing part 126, and a volume calculation part 127.

The first contour calculation part 121 calculates, based on first measurement data which is measurement data of the bucket 403 in an empty state provided by the distance measurement sensor 60, first contour data indicating a contour of the bucket 403. For instance, details of the process by the first contour calculation part 121 will be described below. First, the first contour calculation part 121 extracts pixel data having a depth degree of a threshold or lower from a plurality of pieces of pixel data contained in the first measurement data. The threshold is set to a predetermined value to distinguish the pixel data of the hydraulic excavator 1 contained in the first measurement data from pixel data constituting a background of the hydraulic excavator 1. In this manner, the pixel data indicating the bucket 403 in the empty state is extracted from the first measurement data. Next, the first contour calculation part 121 performs three-dimensional coordinate conversion of arranging each of the extracted pieces of pixel data in the three-dimensional dimensional coordinate space of the distance measurement sensor 60. Subsequently, the first contour calculation part 121 extracts, as first contour data, pixel data located on a plane parallel to a longitudinal direction of the bucket 403 from the pixel data arranged in the three-dimensional coordinate space. Consequently, the first contour data indicating a contour of the bucket 403 projected onto the plane is obtainable. Here, the plane parallel to the longitudinal direction of the bucket 403 perpendicularly intersects a rotational axis of the bucket 403 about the arm 402.

The posture data acquisition part 123 causes the memory 124 to store first posture data which is posture data at a first time when the first measurement data is provided and the first contour data calculated by the first contour calculation part 121 in association with each other. In the description below, the first posture data includes a bucket angle at the first time. However, the first posture data is not limited thereto, and may include an arm angle and a boom angle at the first time.

In the embodiment, a time when the posture of the bucket 403 reaches a predetermined reference bucket angle through a manipulation by the operator in the measurement mode is defined as the first time. In this case, the posture data acquisition part 123 may monitor the posture data provided by the posture sensor 50, and cause the memory 124 to store the first contour data calculated by the first contour calculation part 121 and the reference bucket angle in association with each other in response to a detection that the bucket angle reaches the reference bucket angle. However, this case is just an example, and another time, for example, when the operator inputs a measurement instruction to the switch 70 in working of the hydraulic excavator 1 may be adopted as the first time. In this case, the posture data acquisition part 123 may cause the memory 124 to store the bucket angle measured by the posture sensor 50 at the first time and the first contour data in association with each other.

The posture data acquisition part 123 further acquires second posture data provided by the posture sensor 50 at a second time after the first time. In the description below, the second posture data includes a bucket angle at the second time. However, the second posture data is not limited thereto, and may include an arm angle and a boom angle at the second time.

The memory 124 includes a non-volatile storage device, e.g., a solid state drive and a flush memory. The memory 124 stores the first contour data and the first posture data in association with each other.

The second contour calculation part 122 calculates, based on second measurement data which is measurement data of the soil and sand contained in the bucket 403 as provided by the distance measurement sensor 60, second contour data indicating a surface contour of the soil and sand at a second time after the first time. The second time represents a sampling time obtained by dividing, for example, an excavation operation term and/or a raising operation term by a predetermined calculation period. For instance, details of the process by the second contour calculation part 122 will be described below. First, the second contour calculation part 122 extracts pixel data having a depth degree of a threshold or lower from a plurality of pieces of pixel data contained in the second measurement data. The threshold is the same as the aforementioned threshold used by the first contour calculation part 121. In this manner, the pixel data of the soil and sand contained in the bucket 403 and seen from the opening 403a is extracted from the second measurement data. The extracted pixel data may contain pixel data of an edge of the bucket 403. Next, the second contour calculation part 122 performs three-dimensional coordinate conversion of arranging each of the extracted pieces of pixel data in the three-dimensional coordinate space of the distance measurement sensor 60. Subsequently, the second contour calculation part 122 extracts, as second contour data, pixel data located on a plane parallel to the longitudinal direction of the bucket 403 from the pixel data arranged in the three-dimensional coordinate space. Consequently, the second contour data indicating the contour of the soil and sand projected onto the plane is obtainable.

For instance, the second contour data may be repetitively calculated in a predetermined calculation period in working of the hydraulic excavator 1, or may be repetitively calculated in a predetermined calculation period in the excavation operation and/or the raising operation.

The differential information calculation part 125 calculates differential information indicating a difference between the first posture data and the second posture data which is the posture data provided by the posture sensor 50 at the second time. In the embodiment where the distance measurement sensor 60 is attached to the arm 402, the differential information calculation part 125 calculates, as the differential information, a difference angle between the bucket angle measured by the posture sensor 50 at the second time and the bucket angle stored in the memory 124.

The rotation processing part 126 rotates, based on the differential information, the second contour data in the three-dimensional coordinate space of the distance measurement sensor 60 so that the posture of the working gear 4 from the distance measurement sensor 60 to the bucket 403 at the second time agrees with the posture of the working gear 4 from the distance measurement sensor 60 to the bucket 403 at the first time. In the embodiment, the distance measurement sensor 60 is attached to the arm 402. Therefore, the rotation processing part 126 rotates the second contour data so that the posture of the working gear 4 from the distance measurement sensor 60 to the bucket 403 at the first time agrees with the posture of the working gear 4 from the distance measurement sensor 60 to the bucket 403 at the second time. Specifically, the rotation processing part 126 rotates the second contour data by the difference angle so that the bucket angle at the first time agrees with the bucket angle at the second time.

For instance, in a case where a difference angle $\Delta\theta$ is defined as a value obtained by subtracting the bucket angle at the first time from the bucket angle at the second time, the rotation processing part 126 may rotate the second contour data by executing a matrix calculation of rotating the second contour data on the plane by $-\Delta\theta$.

The inner surface of the bucket 403 is viewed in different ways from the distance measurement sensor 60 depending on the bucket angle. However, the second contour data rotated in the aforementioned manner can correspond to contour data as provided at the same bucket angle as the bucket angle at the first time.

The volume calculation part 127 specifies a region defined by the second contour data rotated by the rotation processing part 126 and the first contour data stored in the memory 124, and calculates, based on the specified region, a volume of the soil and sand contained in the bucket 403 at the second time. Specifically, the volume calculation part 127 may calculate an area of the region as a cross-sectional area of the soil and sand contained in the bucket 403, and calculate the volume of the soil and sand by multiplying the cross-sectional area by a width of the bucket 403.

Here, the volume calculation part 127 may calculate the cross-sectional area by dividing the region into a plurality of trapezoidal sections and adding an area of each of the trapezoidal sections.

The switch 70 receives an instruction from the operator for driving the hydraulic excavator 1 in the semi-automatic operation mode, the manual mode, or the fully-automatic mode. The switch 70 further receives an instruction from the operator for setting the operation mode of the hydraulic excavator 1 to the aforementioned measurement mode, or receives a measurement instruction of designating the first time.

The display part 80 displays an image showing the volume calculated by the volume calculation part 127. The displayed volume may be a volume of the soil and sand excavated in one excavation operation.

Figure 4:
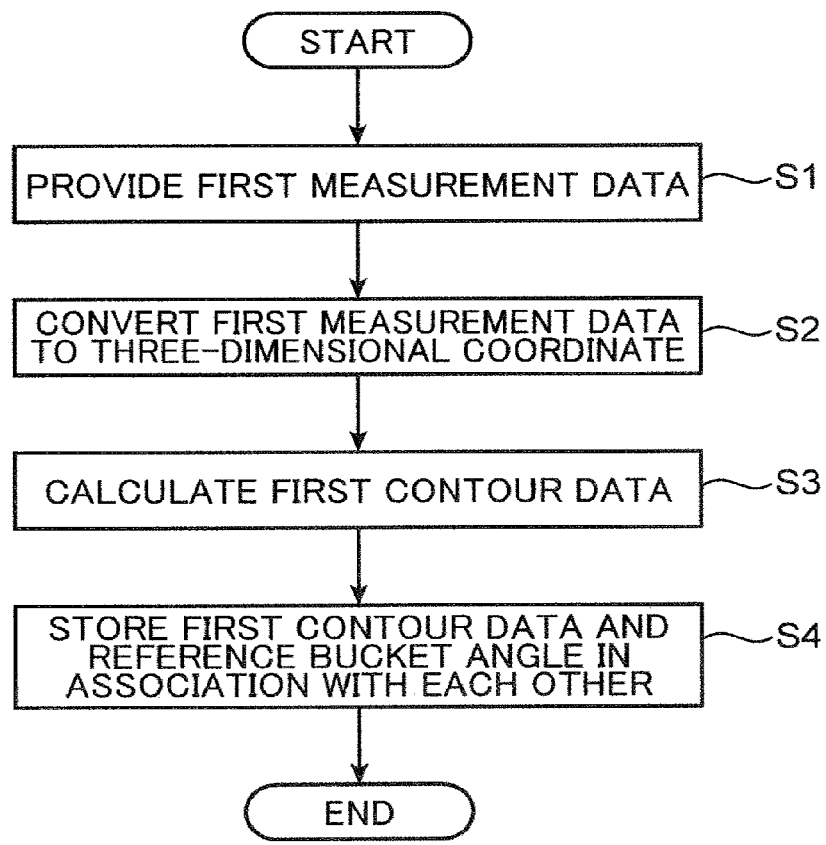
FIG. 4 is a flowchart showing an exemplary process by the hydraulic excavator in a measurement mode.

Next, a process in the measurement mode will be described. FIG. 4 is a flowchart showing an exemplary process by the hydraulic excavator 1 in the measurement mode. The measurement mode is started, for example, in response to an input of an instruction from the operator to the switch 70 for setting the operation mode of the hydraulic excavator 1 to the measurement mode.

Figure 8:
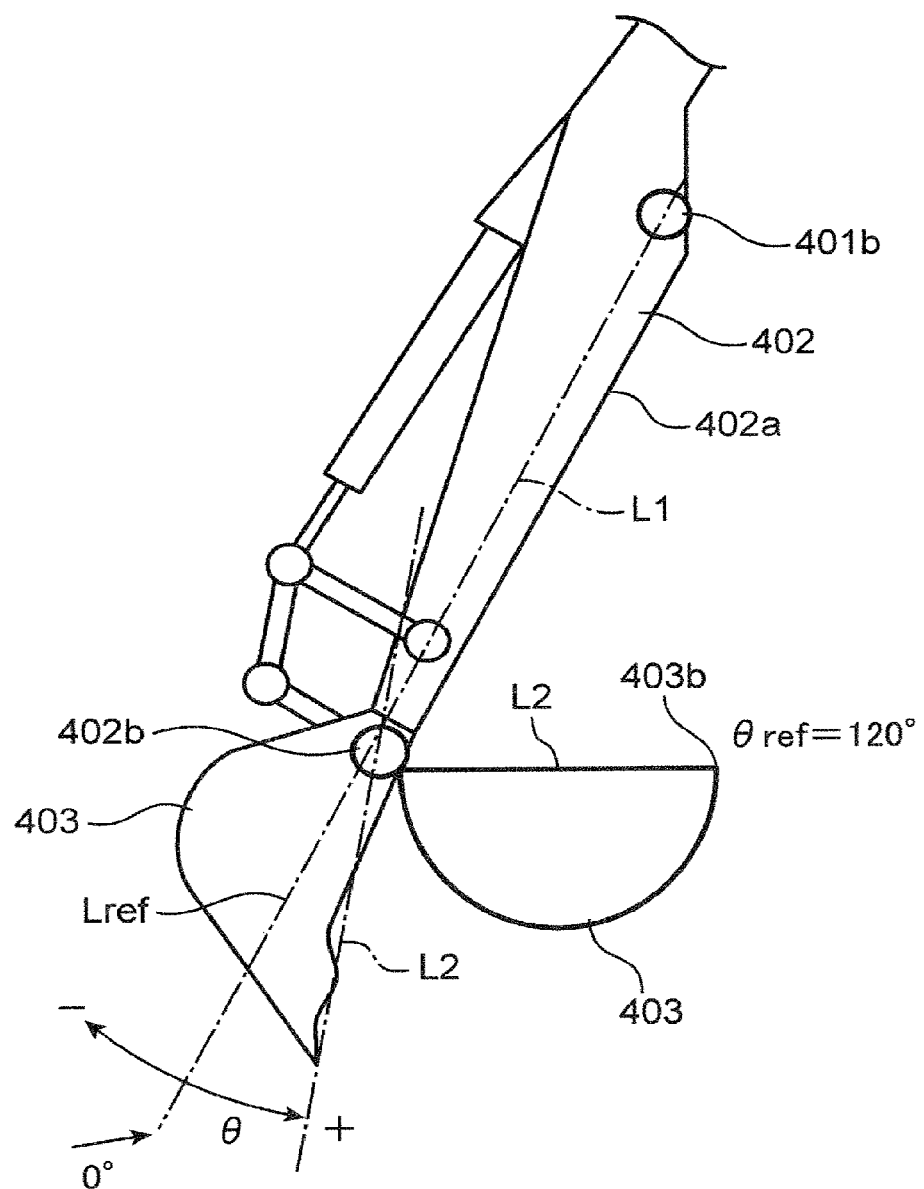
FIG. 8 is a view explaining a reference bucket angle.

In step S1, the distance measurement sensor 60 provides, as first measurement data, measurement data of the bucket 403 positioned at a reference bucket angle in response to a manipulation by the operator. FIG. 8 is a view explaining a reference bucket angle θref. The example in FIG. 8 shows the arm 402 and the bucket 403 viewed in a widthwise direction. Here, the widthwise direction is parallel to the rotational axis of the bucket 403. A longitudinal direction L1 represents a direction in which a straight line connecting a distal end 401b of the boom 401 and a distal end 402b of the arm 402 to each other extends.

In the example shown in FIG. 8, a bucket angle θ is defined between a longitudinal direction L2 of the bucket 403 and a reference direction Lref. The longitudinal direction L2 represents a direction in which a straight line connecting the distal end 402b of the arm 402 and a distal end 403b of the bucket 403 to each other extends. The reference direction Lref corresponds to the longitudinal direction L2 when the longitudinal direction L1 and the longitudinal direction L2 align. The bucket angle θ takes a plus value in a rotation direction (counterclockwise direction in the example shown in FIG. 8) in which the distal end 403b rotates closer to the rear surface 402a of the arm 402 from the reference direction Lref, and takes a minus value in another rotation direction (clockwise direction in the example shown in FIG. 8) in which the distal end 403b rotates away from the rear surface 402a. The relation between the plus value and the minus value may be oppositely defined.

An example of the reference bucket angle θref is 120°. However, any angle may be adopted as the reference bucket angle θref under the condition that the whole area of the inner surface of the bucket 403 falls within the view filed of the distance measurement sensor 60.

The second controller 120 may cause the display part 80 to display an image encouraging the operator to perform a manipulation of setting the bucket angle of the bucket 403 in the empty state to the reference bucket angle at the start of the measurement mode.

Referring back to FIG. 4, in step S2, the first contour calculation part 121 performs three-dimensional coordinate conversion of arranging the first measurement data provided in step S1 in the three-dimensional coordinate space.

In step S3, the first contour calculation part 121 calculates, as first contour data, pixel data located on a plane parallel to the longitudinal direction of the bucket 403 among the pixel data arranged in the three-dimensional coordinate space.

Figure 5:
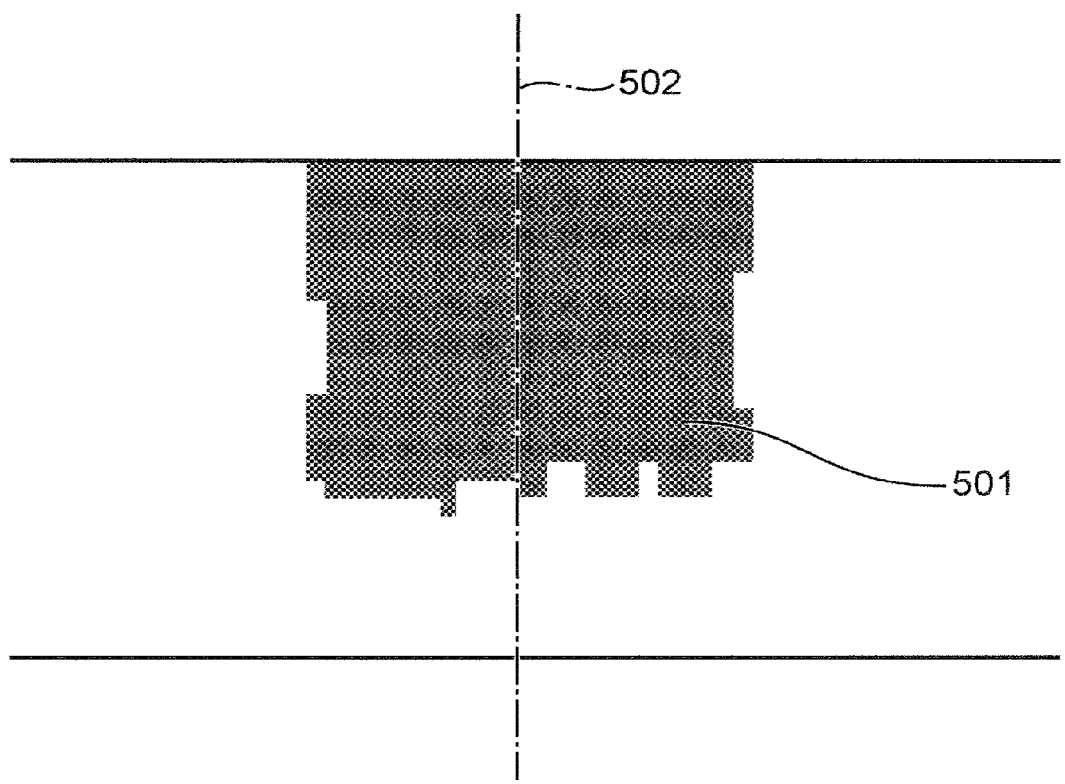
FIG. 5 shows exemplary first measurement data provided by a distance measurement sensor.

FIG. 5 shows exemplary first measurement data provided by the distance measurement sensor 60. It is seen from FIG. 5 that the first measurement data includes: a bucket region 501 having pixel data indicating an inner surface of the bucket 403 viewed from the opening 403a; and a background of the bucket 403. Here, the density of the bucket region 501 is uniformly expressed for convenience, but is actually expressed in gradation in accordance with a distance between the distance measurement sensor 60 and the bucket 403. Besides, the density of the background is expressed in a single color, i.e., white color, but the density is actually expressed in gradation in accordance with a distance between a certain object, e.g., ground, existing around the bucket 403 and the distance measurement sensor 60.

The first contour calculation part 121 extracts pixel data having a depth degree of a threshold or lower from the first measurement data shown in FIG. 5, and arranges the extracted pixel data in the three-dimensional coordinate space. In this manner, the pixel data constituting the bucket region 501 is arranged in the three-dimensional coordinate space.

The first contour calculation part 121 sets a plane 502 for pixel data arranged in the three-dimensional coordinate space. The plane 502 is parallel to the longitudinal direction L2 of the bucket 403 and perpendicularly intersects an opening plane of the bucket 403. Furthermore, the plane 502 is set to almost the center in a width direction of the bucket 403. Subsequently, the first contour calculation part 121 extracts pixel data included on the plane 502 from the pixel data of the bucket region 501.

Figure 6:
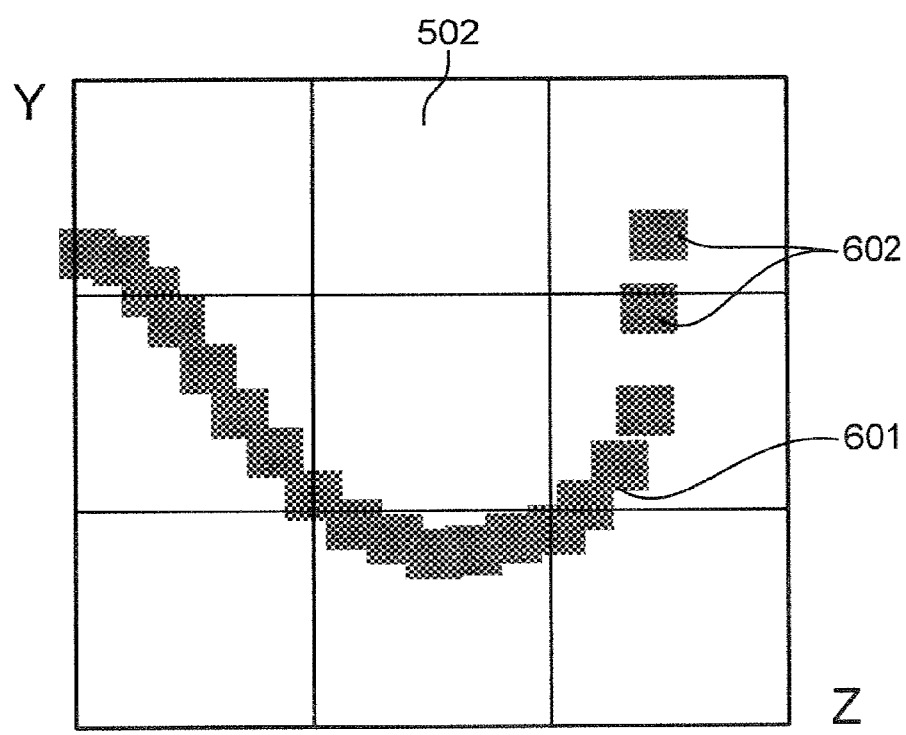
FIG. 6 shows exemplary pixel data included on a plane set in a bucket region.

FIG. 6 shows exemplary pixel data included on the plane 502 set in a bucket region 501. The plane 502 has a Y-axis set in a vertical direction thereof and a Z-axis set in a horizontal direction thereof. The Y-axis denotes a height direction in the three-dimensional coordinate space of the distance measurement sensor 60. The Z-axis denotes a depth direction in the three-dimensional coordinate space. The three-dimensional coordinate space is expressed by a three-dimensional rectangular coordinate system defined by three axes, i.e., an X-axis, the Y-axis, and the Z-axis. The X-axis denotes the widthwise direction of the hydraulic excavator 1.

The plane 502 includes a plurality of pieces of pixel data 602 indicating the inner surface of the bucket 403 in the empty state. The first contour data 601 is constituted by the pieces of pixel data 602. Accordingly, the first contour data 601 is calculated.

Referring back to FIG. 4, in step S4, the posture data acquisition part 123 causes the memory 124 to store the first contour data and the reference bucket angle in association with each other.

Consequently, the process in the measurement mode is finished. Next, a process of calculating a volume of the soil and sand contained in the bucket 403 will be described. FIG.

Figure 7:
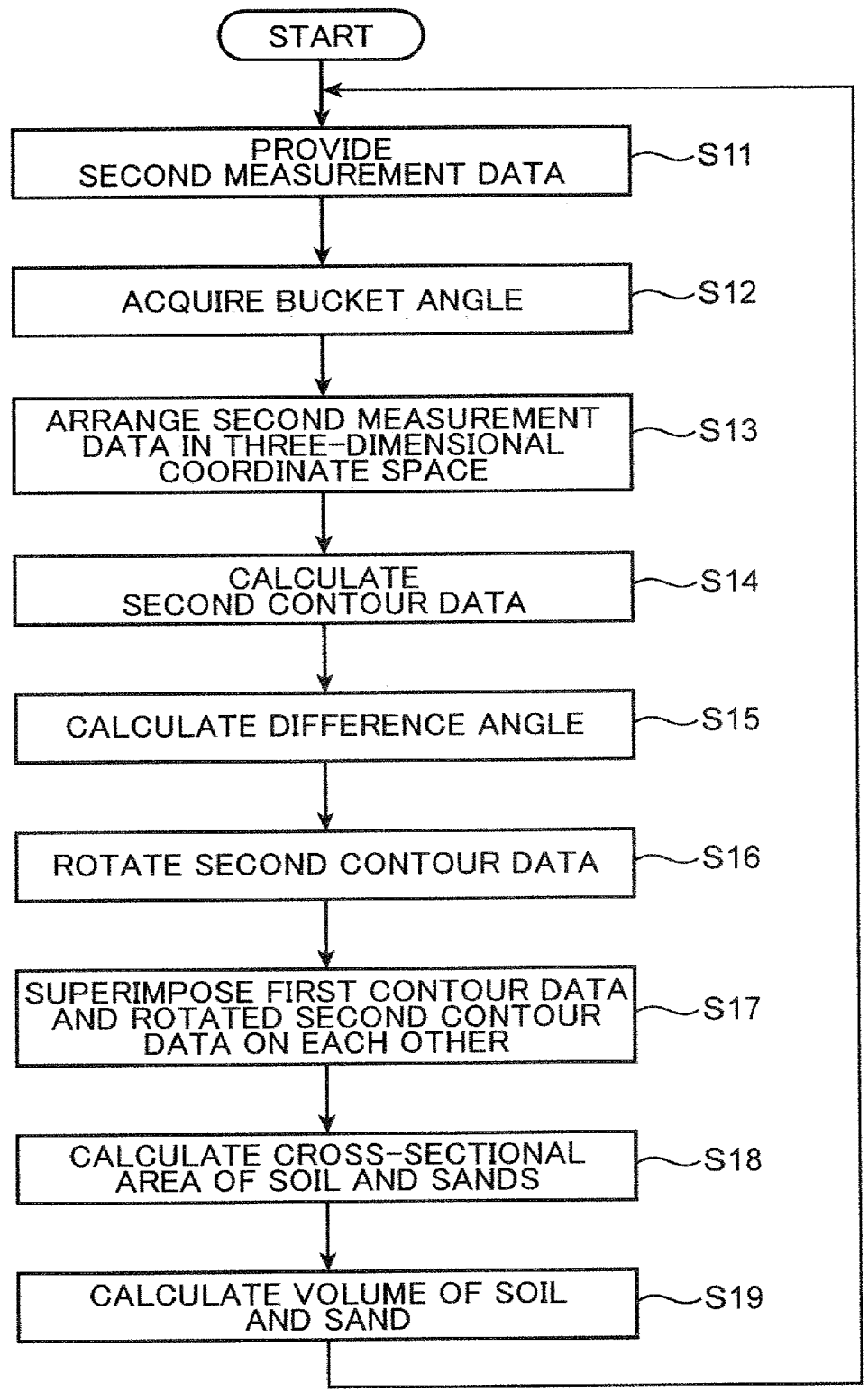
FIG. 7 is a flowchart showing an exemplary process of calculating a volume.

7 is a flowchart showing an exemplary process of calculating the volume. The flow shown in the flowchart in FIG. 7 is repeated in a predetermined calculation period. The one-loop process in the flowchart in FIG. 7 represents a process at the second time.

In step S11, the distance measurement sensor 60 provides second measurement data which is measurement data at a second time. In step S12, the posture data acquisition part 123 acquires a bucket angle measured by the posture sensor 50 at the second time.

In step S13, the second contour calculation part 122 extracts pixel data having a depth degree of a threshold or lower from the second measurement data, and arranges the extracted pixel data in the three-dimensional coordinate space.

In step S14, the second contour calculation part 122 calculates second contour data by extracting pixel data on the plane 502 from the pixel data arranged in the three-dimensional coordinate space. Accordingly, the second contour data indicating a surface contour of the soil and sand contained in the bucket 403 at the second time is obtained.

In step S15, the differential information calculation part 125 calculates a difference angle between the bucket angle acquired in step S12 and the reference bucket angle stored in the memory 124.

In step S16, the rotation processing part 126 rotates the second contour data calculated in step S14 by the difference angle calculated in step S15. The rotation process is described in detail above, and thus further explanation therefor is omitted here.

Figure 9:
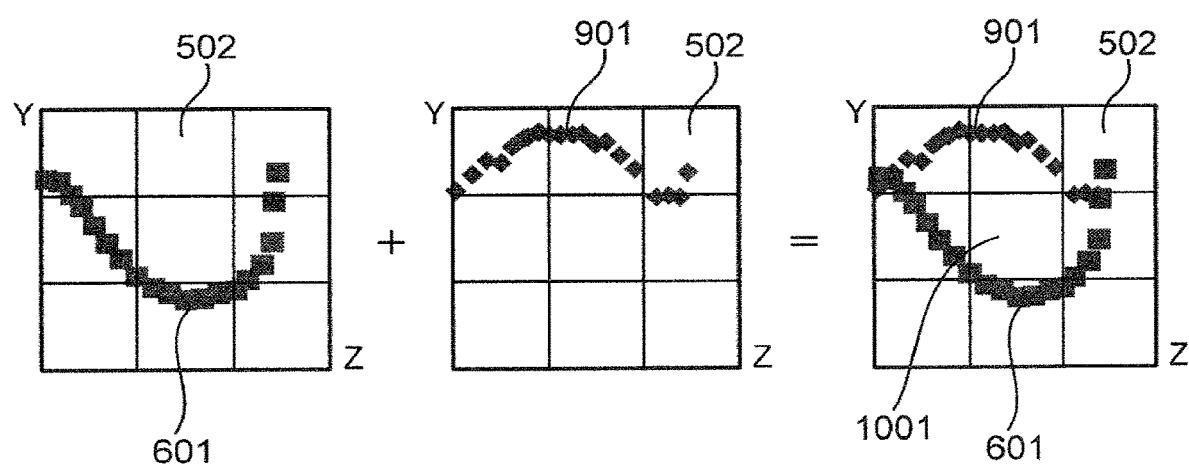
FIG. 9 is an explanatory view for a process of superimposing first contour data and second contour data on each other.

In step S17, the volume calculation part 127 superimposes the first contour data and the second contour data rotated in step S16 onto the plane 502. FIG. 9 is an explanatory view for a process of superimposing the first contour data 601 and second contour data 901 on each other. In FIG. 9, the left view shows the first contour data 601 stored in the memory 124, the middle view shows the rotated second contour data, and the right view shows the first contour data 601 and the second contour data 901 superimposed on each other.

As shown in the middle view, the second contour data 901 corresponds to contour data as provided at the same bucket angle as the reference bucket angle owing to the rotation process. Hence, as shown in the right view, the first contour data 601 and the second contour data 901 superimposed on each other onto the plane 502 result in defining a region 1001 between the first contour data 601 and the second contour data 901.

Figure 10:
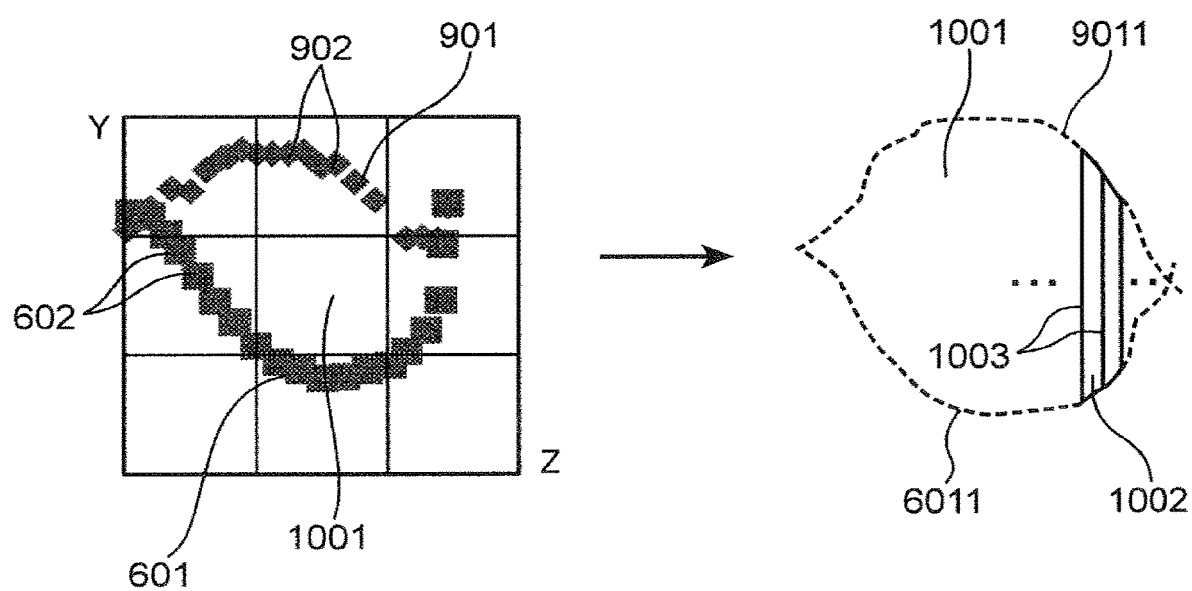
FIG. 10 is a an explanatory view for a process of calculating a cross-sectional area of soil and sand.

Referring back to FIG. 7, in step S18, the volume calculation part 127 calculates a cross-sectional area of the soil and sand contained in the bucket 403. FIG. 10 is an explanatory view of a process of calculating the cross-sectional area of the soil and sand.

The volume calculation part 127 calculates an outline 6011 of the first contour data 601 on the plane 502 by using the pixel data 602 constituting the first contour data 601. Moreover, the volume calculation part 127 calculates an outline 9011 of the second contour data 901 on the plane 502 by using the rotated second contour data 901. Then, the volume calculation part 127 extracts a region 1001 defined by the outline 6011 and the outline 9011.

The volume calculation part 127 having extracted the region 1001 divides the region 1001 with a plurality of straight lines 1003 parallel to the Y-axis, and obtains an intersection of each straight line 1003 and the outline 6011, and an intersection of each straight line 1003 and the outline 9011. The volume calculation part 127 having obtained such intersections in this manner connects adjacent intersections to each other by a straight line. Accordingly, the region 1001 is divided into a plurality of trapezoidal sections 1002 extending in a longitudinal direction which is parallel to the Y-axis and arranged side by side in the Z-axial direction. The volume calculation part 127 having finished the dividing obtains an area of each of the trapezoidal sections 1002, and adding each obtained area. As a result, the area of the region 1001, i.e., the cross-sectional area of the soil and sand, is calculated by way of trapezoidal approximation.

Referring back to FIG. 7, in step S19, the volume calculation part 127 calculates a volume of the soil and sand by multiplying the cross-sectional area of the soil and sand calculated in step S18 by a width of the bucket 403. When step S19 is finished, the flow is returned to step S11.

Figure 11:
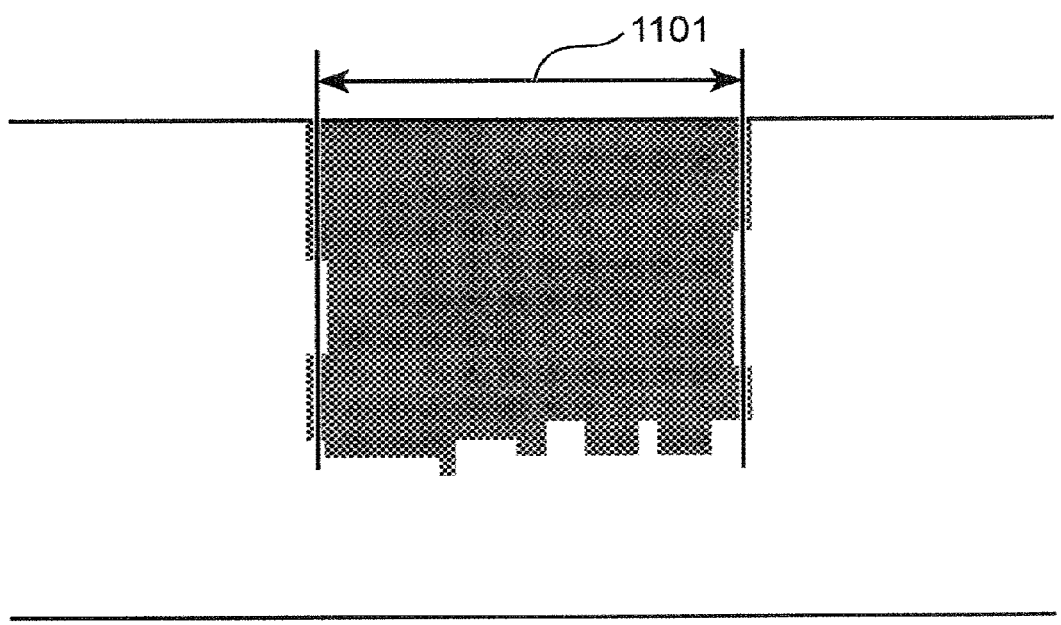
FIG. 11 is a an explanatory view for a process of calculating a volume of the soil and sand.

FIG. 11 is an explanatory view for a process of calculating the volume of the soil and sand. As shown in FIG. 11, the volume of the soil and sand is calculated by multiplying the cross-sectional area of the soil and sand calculated in step S18 by a predetermined width 1101 of the bucket 403. The width 1101 is, for example, stored in the memory 124.

As described above, according to the embodiment, the first contour data which is the contour data of the bucket 403 in the empty state is calculated at the first time, and the calculated first contour data is stored in the memory 124 in association with the bucket angle at the first time. At the second time, the second contour data which is the contour data of the bucket 403 containing the soil and sand is calculated. The difference angle between the bucket angle at the first time and the bucket angle at the second time is calculated. The second contour data is rotated in the coordinate space by the difference angle. In this manner, the rotated second contour data corresponds to the contour data as provided in the same posture of the bucket at the first time. As a result, the volume of the object at the second time is calculatable based on the region defined by the rotated second contour data and the first contour data, and thus the volume of the object can be accurately calculated.

Furthermore, owing to the memory 124, once the first contour data of the bucket in the empty state is calculated, the volume of the object at the second time is calculatable from the second contour data thereafter without setting the working gear in a predetermined posture. This results in eliminating the necessity of setting the working gear in the predetermined posture per containing of the object, and thus preventing a decrease in the work efficiency. Moreover, owing to the memory 124, the volume of the object is calculatable per calculation of the second contour data, and thus the process of calculating the volume is executable in real time.

The present invention can adopt modifications described below.

(1) Although the first contour data is constituted by the pixel data located on the single plane 502 in the example shown in FIG. 5, the present invention is not limited thereto. The first contour data may be constituted by pixel data respectively located on N-planes 502 (in integer, i.e., two or more planes). The second contour data may be constituted by pixel data respectively included on N-planes 502 in the same manner as the first contour data.

In this case, the second controller 120 may calculate the volume of the soil and sand in the following manner. First, the rotation processing part 126 rotates the second contour data respectively on the N-planes 502 by a difference angle. Subsequently, the volume calculation part 127 calculates N-cross-sectional areas respectively defined by N-pieces of rotated second contour data and N-pieces of first contour data corresponding to the N-pieces of the rotated second contour data. For instance, the N-pieces of the first contour data corresponding to the N-pieces of the second contour data mean the first contour data on a first plane 502 for the second contour data on the first plane 502, and mean the first contour data on a second plane 502 for the second contour data on the second plane 502. Next, the volume calculation part 127 calculates a cumulative value of the N-cross-sectional areas as the volume of the soil and sand. This configuration can more accurately calculate the volume of the soil and sand.

(2) Although the distance measurement sensor 60 is attached to the rear surface 402a of the arm 402 in the example shown in FIG. 1, the present invention is not limited thereto. The distance measurement sensor 60 may be attached to a rear surface 401a of the boom 401.

The process executed by the second controller 120 in this case will be described below. The posture data acquisition part 123 acquires, as first posture data, a bucket angle and an arm angle at a first time, and causes the memory 124 to store the first posture data and first contour data calculated by the first contour calculation part 121 in association with each other. The posture data acquisition part 123 further acquires, as second posture data, a bucket angle and an arm angle at a second time. The differential information calculation part 125 calculates an arm difference angle which is a difference angle between the arm angle at the second time and the arm angle at the first time. The differential information calculation part 125 calculates a bucket difference angle which is a difference angle between the bucket angle at the second time and the bucket angle at the first time. The rotation processing part 126 rotates the second contour data by using the arm difference angle and the bucket difference angle so that the posture of each of the arm 402 and the bucket 403 at the second time respectively agrees with the posture of each of the arm 402 and the bucket 403 at the first time.

When the rotation process is finished, the volume calculation part 127 calculates a volume of soil and sand by using the rotated second contour data and the first contour data in the same manner as described above.

This configuration can calculate the volume of the object contained in the bucket 403 even in the case where the distance measurement sensor 60 is attached to the boom 401.

Alternatively, the distance measurement sensor 60 may be attached to a front surface of the upper slewing body 3. In this case, calculated, as each difference angle, are a boom difference angle between a boom angle at a first time and a boom angle at a second time, an arm difference angle between an aim angle at the first time and an arm angle at the second time, and a bucket difference angle between a bucket angle at the first time and a bucket angle at the second time. The rotation processing part 126 rotates second contour data 901 by using the boom difference angle, the arm difference angle, and the bucket difference angle so that the posture of each of the boom 401, the arm 402, and the bucket 403 at the second time agrees with the posture of each of the boom 401, the arm 402, and the bucket 403 at the first time.

When the rotation process is finished, the volume calculation part 127 calculates a volume of soil and sand by using the rotated second contour data 901 and the first contour data in the same manner as described above. This configuration can calculate the volume of the soil and sand contained in the bucket 403 in the case where the distance measurement sensor 60 is attached to the upper slewing body 3.

(3) Although the measurement device is applied to the hydraulic excavator 1 in the embodiment, the present invention is not limited thereto. The measurement device may be applied to a machine, e.g., aim robot, other than a construction machine such as the hydraulic excavator 1. The arm robot includes a main body and a working gear. The working gear includes an arm member rotatably attached to the main body, and a container rotatably attached to a distal end of the arm member. The arm member has one or more joints and allows a posture of the aim member to be changed. The container is configured to contain, for example, an object by a scooping operation and discharge the contained object at a specific position. The object may include granular foods, e.g., popcorns, or a matter other than foods, e.g., beads or powder chemicals. This configuration can calculate the volume of the object contained in the container even in the case where the measurement device is applied to the arm robot.

(4) Although the second controller 120 is mounted on the hydraulic excavator 1 in the example shown in FIG. 1, the present invention is not limited thereto. The second controller 120 may be mounted on a server connected to the hydraulic excavator 1 via a network. In this case, the server may acquire posture data and measurement data respectively from the posture sensor 50 and the distance measurement sensor 60 mounted on the hydraulic excavator 1. The network may be, for example, a local area network, or a wide area network including the internet and a mobile phone communication network.

(5) Although the display part 80 displays an image showing the volume of the soil and sand contained in the bucket 403 in the embodiment, the present invention is not limited thereto. For instance, the volume calculation part 127 may calculate a weight of the soil and sand by multiplying the calculated volume by a predetermined specific gravity of the soil and sand, and cause the display part 80 to display the calculated weight. This configuration can notify the operator of the weight of the soil and sand contained in the bucket 403. Furthermore, the volume calculation part 127 may calculate a work quantity of the hydraulic excavator 1 from the calculated weight, and cause the display part 80 to display the calculated work quantity. In this case, the volume calculation part 127 may calculate a total value of the volume of the soil and sand contained in the bucket 403 per unit time, e.g., per day, and per hour, and calculate the work quantity per time unit based on the total value.

Additionally, when the total value of the calculated volume reaches a maximum loading capacity or more of a dump truck serving as a discharge destination of the soil and sand, the volume calculation part 127 may cause the display part 80 to display relevant information indicating the reaching of the capacity or more.

SUMMARY OF EMBODIMENT

The embodiment will be summarized below.

A measurement device according to one aspect of the present invention is a measurement device for a working gear including: an arm member tiltably attached to a main body and having one or more joints for allowing a posture of the arm member to be changed; and a container rotatably attached to the arm member and having an opening for permitting an object to enter and leave the container, the measurement device being configured to measure a volume of the object contained in the container. The measurement device includes: a distance detector which is attached to the arm member and provides measurement data indicating a distance to a subject; a posture detector which provides posture data indicating a posture of the working gear; a first contour calculation part which calculates, based on first measurement data which is the measurement data of the container in an empty state provided by the distance detector, first contour data indicating a contour of the container; a memory which stores first posture data which is the posture data at a first time when the first measurement data is provided and the first contour data in association with each other; a second contour calculation part which calculates, based on second measurement data which is the measurement data of the object contained in the container as provided by the distance detector, second contour data indicating a surface contour of the object at a second time after the first time; a differential information calculation part which calculates differential information indicating a difference between the first posture data and the second posture data which is the posture data provided by the posture detector at the second time; a rotation processing part which rotates, based on the differential information, the second contour data in a three-dimensional coordinate space of the distance detector so that the posture of the working gear from the distance detector to the container at the second time agrees with the posture of the working gear from the distance detector to the container at the first time; and a volume calculation part which specifies a region defined by the rotated second contour data and the first contour data, and calculates, based on the specified region, a volume of the object contained in the container at the second time.

The memory stores the first contour data at the first time and first posture data of the container in the empty state at the first time in association with each other. The second contour data indicating the surface contour of the object is calculated, based on the second measurement data provided at the second time after the first time. The differential information indicating a difference between the second posture data of the working gear at the second time and the first posture data of the working gear at the first time is calculated. The second contour data is rotated in the three-dimensional coordinate space of the distance detector so that the posture of the working gear from the distance detector to the container at the second time agrees with the posture of the working gear from the distance detector to the container at the first time. In this manner, the rotated second contour data corresponds to the contour data as provided in the same posture of the container at the first time. As a result, the volume of the object at the second time is calculatable based on the region defined by the rotated second contour data and the first contour data, and thus the volume of the object can be accurately calculated.

Furthermore, owing to the memory, once the first contour data of the container in the empty state is calculated, the volume of the object at the second time is calculatable from the second contour data thereafter without setting the working gear in a predetermined posture. This results in eliminating the necessity of setting the working gear in the predetermined posture per containing of the object, and thus preventing a decrease in the work efficiency. Moreover, owing to the memory, the volume of the object is calculatable per calculation of the second contour data, and thus the process of calculating the volume can be executed in real time.

In the measurement device, it is preferable that the first contour data indicates a contour of the container projected onto a plane which is in the three-dimensional coordinate space and perpendicularly intersects a rotational axis of the container about the arm member, and the second contour data indicates a surface contour of the object projected onto the plane. The rotation processing part preferably rotates, based on the differential information, the second contour data on the plane. The volume calculation part preferably specifies, on the plane, a region defined by the rotated second contour data and the first contour data, calculates, based on the region, a cross-sectional area of the object, and calculates a volume of the object by multiplying the cross-sectional area by a width of the container.

In this configuration, the second contour data is rotated on the plane which is parallel to the longitudinal direction of the container in the coordinate space, based on the differential information. The region defined by the rotated second contour data and the first contour data on the plane is calculated. The cross-sectional area of the object is calculated, based on the region. The volume of the object is calculated by multiplying the cross-sectional area by the width of the container. Accordingly, the volume of the object is calculatable through a simple process.

In the measurement device, the cross-sectional area is preferably calculated by dividing the region defined by the first contour data and the second contour data into a plurality of trapezoidal sections and adding an area of each of the trapezoidal sections.

According to the configuration, the region defined by the first contour data and the second contour data is divided into the plurality of trapezoidal sections, and the area of each of the trapezoidal sections is calculated. This configuration where the cross-sectional area is calculated by way of the trapezoidal approximation can calculate the cross-sectional area more accurately than a configuration where the cross-sectional area is calculated by way of approximation with a plurality of other quadrangular-shaped sections.

In the measurement device, the arm member preferably has a surface facing the opening, and the distance detector is preferably attached to the surface.

In this configuration, the distance detector attached to the surface can measure the distance from the opening of the container, and thus can accurately provide the measurement data of the object.

In the measurement device, preferably, the arm member is tiltably attached to the main body which is included in a construction machine.

This configuration can calculate the volume of the object excavated by the construction machine.

In the measurement device, preferably, the object preferably includes soil and sand.

This configuration further can calculate the volume of the soil and sand contained in the container.

A construction machine according to another aspect of the present invention includes: a working gear including an arm member tiltably attached to a main body and having one or more joints for allowing a posture of the arm member to be changed, and a bucket rotatably attached to the aim member; a distance detector which is attached to the arm member and provides measurement data indicating a distance to a subject; a posture detector which provides posture data indicating a posture of the working gear; a first contour calculation part which calculates, based on first measurement data which is the measurement data of the bucket in an empty state provided by the distance detector, first contour data indicating a contour of the bucket; a memory which stores first posture data which is the posture data at a first time when the first measurement data is provided and the first contour data in association with each other; a second contour calculation part which calculates, based on second measurement data which is the measurement data of soil and sand contained in the bucket as provided by the distance detector, second contour data indicating a surface contour of the soil and sand at a second time after the first time; a differential information calculation part which calculates differential information indicating a difference between the first posture data and the second posture data which is the posture data provided by the posture detector at the second time; a rotation processing part which rotates, based on the differential information, the second contour data in a three-dimensional coordinate space of the distance detector so that the posture of the working gear from the distance detector to the bucket at the second time agrees with the posture of the working gear from the distance detector to the bucket at the first time; and a volume calculation part which specifies a region defined by the rotated second contour data and the first contour data, and calculates, based on the specified region, a volume of the soil and sand contained in the bucket at the second time.

This configuration succeeds in providing a construction machine which can accurately calculate a volume of an object contained in a bucket while preventing a decrease in the work efficiency in the same manner as the above-described measurement device.

The invention claimed is:

1. A measurement device for a working gear including: an arm member tiltably attached to a main body and having one or more joints for allowing a posture of the arm member to be changed; and a container rotatably attached to the arm member and having an opening for permitting an object to enter and leave the container, the measurement device being configured to measure a volume of the object contained in the container, and comprising:
   a distance detector which is attached to the arm member and provides measurement data indicating a distance to a subject;
   a posture detector which provides posture data indicating a posture of the working gear;
   a first contour calculation part which calculates, based on first measurement data which is the measurement data of the container in an empty state provided by the distance detector, first contour data indicating a contour of the container;
   a memory which stores first posture data which is the posture data at a first time when the first measurement data is provided and the first contour data in association with each other;
   a second contour calculation part which calculates, based on second measurement data which is the measurement data of the object contained in the container as provided by the distance detector, second contour data indicating a surface contour of the object at a second time after the first time;
   a differential information calculation part which calculates differential information indicating a difference between the first posture data and the second posture data which is the posture data provided by the posture detector at the second time;
   a rotation processing part which rotates, based on the differential information, the second contour data in a three-dimensional coordinate space of the distance detector so that the posture of the working gear from the distance detector to the container at the second time agrees with the posture of the working gear from the distance detector to the container at the first time; and
   a volume calculation part which specifies a region defined by the rotated second contour data and the first contour data, and calculates, based on the specified region, a volume of the object contained in the container at the second time,
   wherein the second time includes a plurality of sampling times each obtained by dividing an excavation operation term and/or a raising operation term by a predetermined calculation period, and
   wherein the differential information calculation part reads out the first contour data from the memory at each of the sampling times, and calculates the differential information indicating a difference between the read first contour data and the second posture data.

2. The measurement device according to claim 1, wherein
   the first contour data indicates a contour of the container projected onto a plane which is in the three-dimensional coordinate space and perpendicularly intersects a rotational axis of the container about the arm member,
   the second contour data indicates a surface contour of the object projected onto the plane,
   the rotation processing part rotates, based on the differential information, the second contour data on the plane, and
   the volume calculation part specifies, on the plane, a region defined by the rotated second contour data and the first contour data, calculates, based on the region, a cross-sectional area of the object, and calculates a volume of the object by multiplying the cross-sectional area by a width of the container.

3. The measurement device according to claim 2, wherein
   the cross-sectional area is calculated by dividing the region defined by the first contour data and the second contour data into a plurality of trapezoidal sections and adding an area of each of the trapezoidal sections.

4. The measurement device according to claim 1, wherein
   the arm member preferably has a surface facing the opening, and
   the distance detector is attached to the surface.

5. The measurement device according claim 1, wherein
   the arm member is tiltably attached to the main body which is included in a construction machine.

6. The measurement device according to claim 1, wherein
   the object includes soil and sand.

7. A construction machine, comprising:
   a working gear including an arm member tiltably attached to a main body and having one or more joints for allowing a posture of the arm member to be changed, and a bucket rotatably attached to the arm member;
   a distance detector which is attached to the arm member and provides measurement data indicating a distance to a subject;
   a posture detector which provides posture data indicating a posture of the working gear;
   a first contour calculation part which calculates, based on first measurement data which is the measurement data of the bucket in an empty state provided by the distance detector, first contour data indicating a contour of the bucket;
   a memory which stores first posture data which is the posture data at a first time when the first measurement data is provided and the first contour data in association with each other;
   a second contour calculation part which calculates, based on second measurement data which is the measurement data of soil and sand contained in the bucket as provided by the distance detector, second contour data indicating a surface contour of the soil and sand at a second time after the first time;
   a differential information calculation part which calculates differential information indicating a difference between the first posture data and the second posture data which is the posture data provided by the posture detector at the second time;

a rotation processing part which rotates, based on the differential information, the second contour data in a three-dimensional coordinate space of the distance detector so that the posture of the working gear from the distance detector to the bucket at the second time agrees with the posture of the working gear from the distance detector to the bucket at the first time; and a volume calculation part which specifies a region defined by the rotated second contour data and the first contour data, and calculates, based on the specified region, a volume of the soil and sand contained in the bucket at the second time, wherein the second time includes a plurality of sampling times each obtained by dividing an excavation operation term and/or a raising operation term by a predetermined calculation period, and wherein the differential information calculation part reads out the first contour data from the memory at each of the sampling times, and calculates the differential information indicating a difference between the read first contour data and the second posture data.

\* \* \* \* \*